Jan. 19, 1943.   R. TRYON ET AL   2,308,900
SHADING FILM
Filed March 23, 1939

RUSSELL TRYON
WALTER B. HIRSH
INVENTORS
BY Joseph J. Juhasz
ATTORNEY

Patented Jan. 19, 1943

2,308,900

UNITED STATES PATENT OFFICE 2,308,900

SHADING FILM

Russell Tryon, Montclair, N. J., and Walter B. Hirsh, Cedarhurst, N. Y., assignors to Transograph Corporation, a corporation of New York Application March 23, 1939, Serial No. 263,814

3 Claims. (Cl. 41—4.5)

This invention relates generally to means for obtaining a Ben Day or screened effect in connection with, drawings, pictures, advertisements or various types of illustration which are reproduced by various printing processes currently practiced in this art, and more particularly to novel sheet or film by the use of which such Ben Day or screened effects are produced, and method of making same.

Among the objects of the present invention is the provision of a so-called shading film, tissue, or sheet which although readily and quickly applied will produce in a printed reproduction of the drawing, a perfect Ben Day or screened effect by reason of an intimate and complete contact with the surface of the drawing, all this without benefit of vacuum frames as known in the photoengraving art.

Another object herein lies in the provision of a novel shading film which may be applied to a drawing in multiple layers so that the effect of different Ben Day screens, shading or dot distribution may be obtained on different areas of the drawing, without affecting the clarity and shape of the screened effect at any point over the entire area of the drawing.

Another object herein is the provision of a shading film which without limitation, adapts it for use in securing not only black or heavily pigmented dots or screened effects on white areas of the drawing but also adapts it for use in securing white screened effects or dots on black areas of the drawing. This object is obtained by a complete transparency both in adhesive material and film element in the present novel shading film.

Another object herein is the provision of a shading film having the above mentioned desirable characteristics and which is more quickly and cheaply applied to the drawing by reason of the fact that the adhesive material associated therewith is constantly extremely tacky or sticky and thus aids the operator rather than hinders him, as is frequently the case with pressure operated shading films which utilize such materials as compounds of wax, or soap and the like and require high pressure to cause a complete transfer, or adhesion.

A feature of the present invention lies in the fact that a prepared screen or background layer is utilized and this need not be altered in any way to fit it for use in connection with the reproduction of the drawing. In other words, instead of the necessity of transferring the screened background or other shading film to the drawing by means of embodying the background elements in a relatively fragile medium, or on the other hand by taking a shading film and cutting out areas from said shading film which exactly match the areas on the drawing which it is desired to provide with a shaded background, it is only necessary that the entire shading film disclosed in the present application be affixed to the surface of the drawing, and the only shading elements which are at all disturbed are those which are removed over the areas which it is desired shall have no shading. These objects and further ends and advantages will more fully appear in the progress of this disclosure and be pointed out in appended claims.

In the drawing in which similar reference characters designate corresponding parts throughout the several views.

Figure 1:
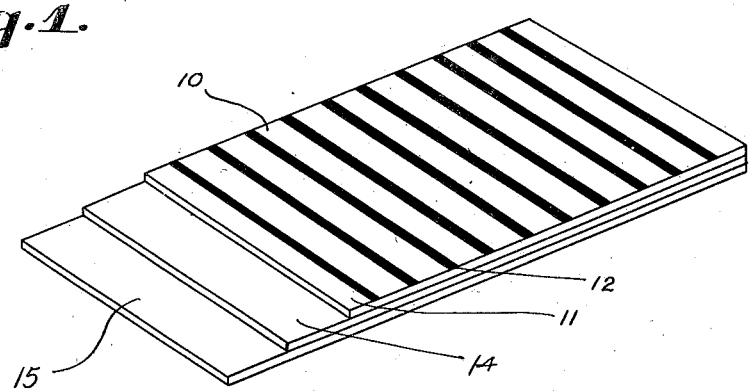
Fig. 1 is a schematic or diagrammatic view in perspective, the thickness of the various parts being exaggerated for the purpose of clarity, showing an embodiment of the invention as the same is prepared in marketable form.

As illustrated in Figure 1, the composite article, that is to say the shading film proper together with the protecting sheet therefor is indicated generally by numeral 10. The article 10 comprises a transparent element 11 which is preferably composed of either a very highly parchmentized paper stock or a very thin and strong tissue, or a cellulosic sheet. In experiments conducted by the applicants a transparent element 11 has been very satisfactorily composed of a thin sheet of "Cellophane." Since practically all photoengraving processes illuminate the drawing or picture from an angle to the plane surface thereof at the time the photographing part of the engraving process is initiated, it is important that the transparent element 11 be very thin so that shading elements 12 do not cast an oblique shadow thereby causing an undesirable distortion in the representation of these background elements in the final lithographic sheet or photoengraved "cut." While from this consideration, it would be desirable that the transparent element 11 be infinitely thin, it is still important that the same have sufficient thickness so that it may have the required mechanical strength. Such strength is necessary because the transparent element is subject to a certain amount of handling both prior to its application to the drawing or picture 13 and during such application.

It is important also that the transparent element 11 be relatively thin because where a plurality of such elements are used in layers upon each other in order to procure composite effects as will be more particularly described below, the distortion of the background elements is increased.

The shading elements 12 are illustrated in the drawing as parallel lines or bars for the purpose of clarity in the drawing, and it will of course be understood by those skilled in the art to which the present invention relates that the shading elements 12 may take any desirable form including not only the parallel lines indicated but also various arrangements of dots commonly referred to as "screens," and various other types of backgrounds.

The shading elements 12 may be placed upon the transparent elements 11 in many different ways, but it is important that these elements be relatively opaque and that the edges of each of the elements be sharp and distinct. Applicants have found that the shading elements 12 may be placed on the upper surface of the transparent sheet 11 by printing upon the upper surface of the transparent element with a suitable size or sizing solution, the areas which it is desired that the shading elements will take. While the size is still moist or tacky, a suitable pigment of any desired color or composition is "pounded" or "flocked" upon the sizing. After the sizing is dry, the unattached pigment particles having been previously removed, the shading elements are then of such a nature that they will absorb or reflect desired amounts or colors of light. The sizing does not permanently bind the pigment particles to the transparent element 11 but allows them to be removed where desired by the simple operation of scraping the same from the sheet or transparent element 11 by means of a suitable scraper.

The lower surface of the transparent element 11 is next coated with a thin layer of a non-drying transparent adhesive 14. Such adhesive is preferably prepared with a relatively small amount of volatile elements so that throughout its useful life it remains permanently tacky. Since the adhesive 14 is also disposed similarly to the transparent element 11 between the shading elements 12 and the picture 13, it is also of importance that the adhesive layer be relatively thin for the reasons given above. Furthermore, it is also important that the adhesive be transparent so that the picture as received by the photoengraver's camera is not deleteriously effected. Such adhesives or binders are presently known in the art pertaining thereto and for that reason will not be more particularly described herein. In experiments conducted by the applicants, satisfactory results were secured with an adhesive composed of rubber in combination with suitable plasticizing agents.

After the adhesive coating 14 has been placed upon the under surface of the transparent element 11 the adhesive 14 is covered with a protective element 15. The protective element serves to keep the adhesive in proper condition from the manufacture of the composite article 10 until the same is ready for use. The protective element 15 is preferably composed of a thin, flexible, non-porous sheet and a thin paper such as "Glassine" or a thin paper very lightly but thoroughly impregnated with a hard wax has been found suitable. It is important that the protective element 15 be of such a nature that the adhesive 14 has a much greater affinity for the under surface of the transparent element 11 than it has for the protective element 15 so that the element 15 may be easily removed at the time the shading film is about to be used on a picture.

Figure 2:
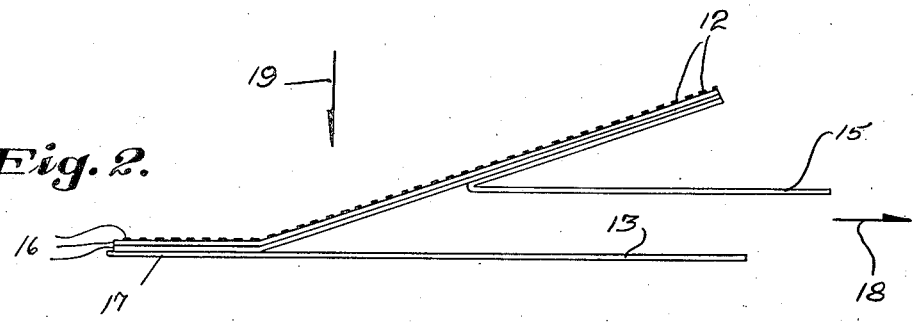
Fig. 2 is a side elevational view showing the embodiment of the invention illustrated in Fig. 1 in the process of being applied to a drawing or other picture which it is desired may have a shaded background.

Since the layer of adhesive 14 is relatively thin, a desirable method of applying the shading film proper indicated by numeral 16 is illustrated in Figure 2. The protective element 15 is peeled back manually at one edge of the film 16 and the adhesive at that point as for example 17 in Figure 2 is pressed into intimate contact with the upper surface of the picture 13. Then as the protective element is pulled away in the direction of the arrow 18 manual pressure is utilized in the direction of the arrow 19 to press the film 16 into intimate contact with the upper surface of the picture 13.

Figure 3:
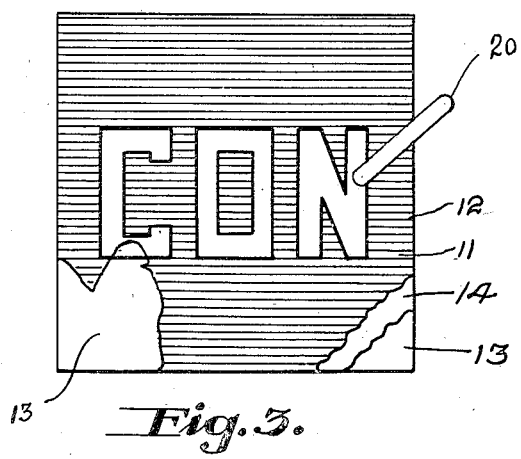
Fig. 3 is a plan view showing a shading film constructed in accordance with the present invention as applied to a picture or paper drawing. In this figure, various layers are torn away to show the relationship of the various elements.

After the film 16 is in complete contact with the picture 13 over the entire area thereof so that there will not be any refraction occur between the transparent element 11 and the picture 13 when the two are exposed for photographic purposes, such portions of the shading element 12 are removed by means of a suitable tool such as a wood stylus 20. The stylus is moved along the upper surface of the transparent element 11 at a suitable angle and with sufficient pressure so as to physically dislodge the shading elements 12, and this step is utilized over all of those areas which it is desired shall appear in the finished photoengraving without any representation of shading. An example of this is illustrated in Figure 3 where the letters are shown unshaded while the background is shown shaded.

Figure 4:
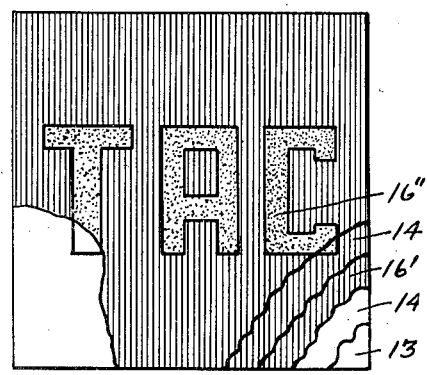
Fig. 4 is a plan view, similar to Fig. 3, in which the use of a plurality of shading films in order to procure a plural back ground effect is shown. In this figure, various layers are torn away to show the relationship of the various elements.

Because of the relatively thin and transparent nature of applicants' shading film 16 and the unique application thereof, it is possible to utilize a plurality of such films superposing one another. When this process is followed, it is of course necessary to remove by means of the stylus 20 from each of the shading films 16 as it is put in place, all of the shading elements 12 which it is desired shall not appear in the final reproduction of the picture, as for example, in Figure 4 the first film 16' has the shading elements 12 removed from an area corresponding to the letters; while the second film 16" has the shading elements in this case in the form of haphazardly distributed dots, removed from all of the area thereof except those areas superposing the letters.

Obviously, a greater number of shading films 16 may be placed superposing each other, for as many different types of shading as it is desired shall appear on the reproduction of the original drawing practical limits will be reached when the top shading film, that is the one furthest removed from the picture 13 is so far away therefrom that undesirable shadows occur by reason of the angular position of the lighting during the photographing process.

By varying the composition of the layer of adhesives 14, it is possible to make either a permanent or a temporary attachment of the shading film 16 to the picture or drawing 13 thus, where it is desired, the shading film may become permanently attached to the picture or it may be temporarily attached so that the shading film may be removed from the picture after the photographing has been completed so that the picture may be in its original state or may be treated with other shading films to get a different effect from the same original picture.

While there has been described a method of making the present shading film in which the shading elements were placed upon the transparent element first, and subsequently thereto, the under surface of the transparent element was coated with an adhesive and then covered with a protective element, it is of course obvious that this process may be reversed so that the adhesive and protective elements are put in place on the underside of the transparent element and subsequently thereto the desired shading elements are printed upon the upper surface of the transparent element.

In accordance with the present invention any desired color may be given to the shading elements 12 since both the transparent element 11 and the layer of adhesive 14 are relatively colorless.

Thus, the present shading film presents notable advantages over the prior art in which wax, or soap or combinations thereof were used as a transfer or adhesive medium since the wax or soap or other relatively opaque materials could not be used on pictures having dark background to give the proper effect which it was desired would be broken up by superposed white background or shading elements.

It may thus be seen that we have provided a novel shading film possessing the advantage of cheapness of manufacture and use and highly desirable results in sharpness of reproduction and adaptability for various types of pictures or drawings which are to be reproduced.

The foregoing description has been made rather detailed for clearness of understanding only, and no unnecessary limitations should be understood therefrom, but the appended claims should be construed as broadly as permissible in view of the prior art.

We claim:

1. A shading film comprising: a transparent element; a plurality of areas of sizing on the upper surface of the transparent element; and pigment material disposed on said areas of sizing and thereby maintained in detachable attachment to said transparent element.

2. A shading film comprising: a transparent element; a plurality of areas of sizing on the upper surface of the transparent element; a pigment material disposed on said areas of sizing and maintained thereby in detachable connection with said transparent element; and a substantially transparent layer of adhesive secured to the lower surface of said transparent element.

3. A shading film comprising: a transparent element; a plurality of areas of sizing on the upper surface of the transparent element; a pigment material disposed on said areas of sizing and maintained thereby in detachable connection with said transparent element; a substantially transparent layer of adhesive secured to the lower surface of said transparent element; and a protective element detachably secured to the lower surface of said transparent layer of adhesive.

RUSSELL TRYON.
WALTER B. HIRSH.